Oct. 5, 1926.
S. COLLEDANCHISE
NOISE MAKING DEVICE
Filed Jan. 23, 1924
1,601,721
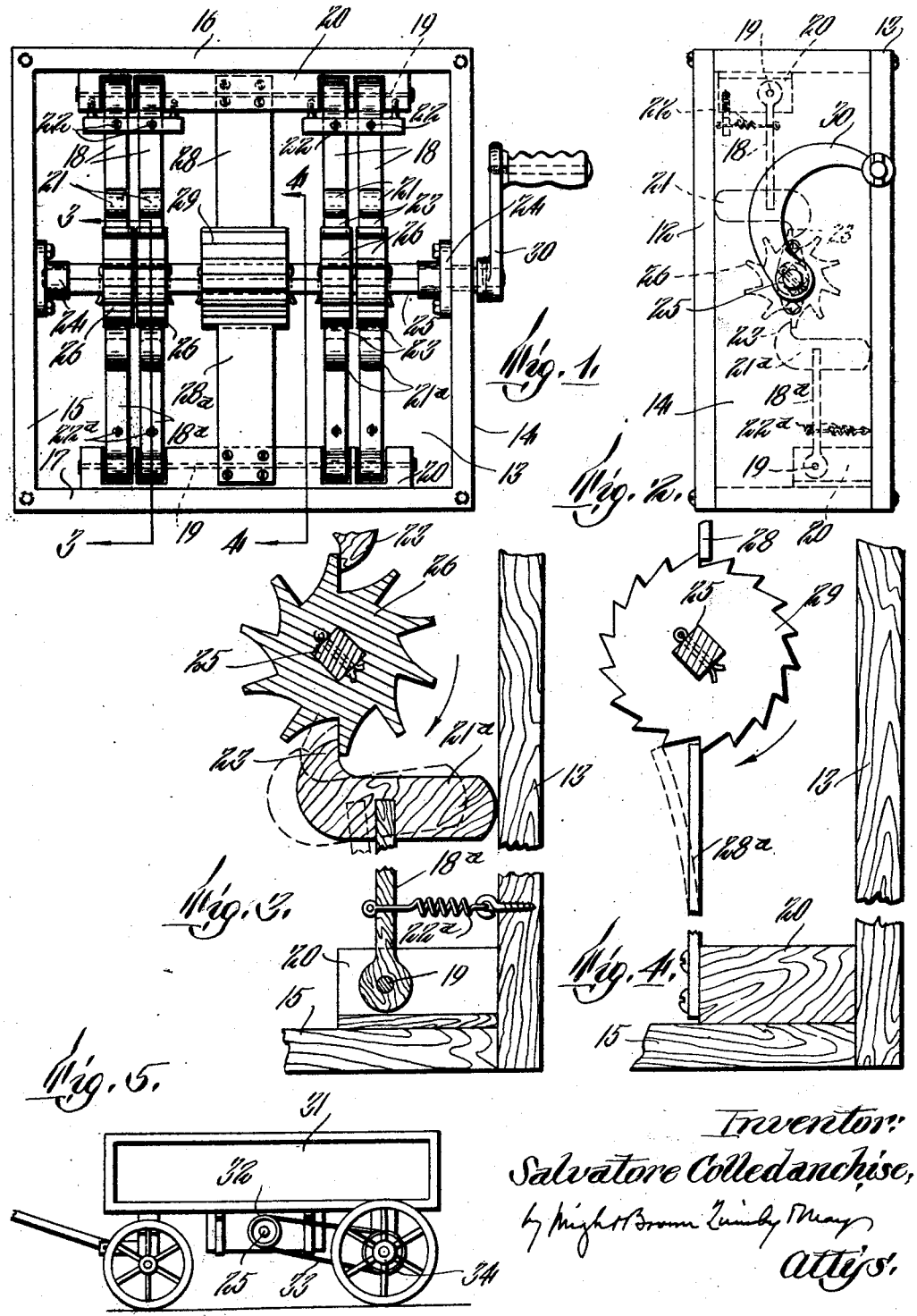
Inventor:
Salvatore Colledanchise, Patented Oct. 5, 1926.

1,601,721

UNITED STATES PATENT OFFICE.

SALVATORE COLLEDANCHISE, OF READVILLE, MASSACHUSETTS.

NOISE-MAKING DEVICE.

Application filed January 23, 1924. Serial No. 687,920.

The object of this invention is to provide a battery of noise-making elements adapted to be actuated by the rotation of a single shaft, and to create a din of unusual character.

This object is attained by the construction hereinafter described and claimed.

Of the accompanying drawings forming a part of this specification,—

Figure 1 is a side view of the device, one of the resonant side walls being removed.

Figure 2 is an end view.

Figure 3 is an enlarged section on line 3—3 of Figure 1.

Figure 4 is an enlarged section on line 4—4 of Figure 1.

Figure 5 shows the device applied to a child's cart, and adapted to be operated by one of the wheels thereof.

The same reference characters indicate the same parts in all of the figures.

The device includes a shallow box composed of two parallel resonant walls 12 and 13 of wood, or any other suitable resonant material, and a four-sided curb connecting the margins of said walls and composed of two opposite sides 14 and 15, and two opposite sides 16 and 17.

To the side 16 are hinged a row of hammer shanks 18, by means of a wire rod or pintle 19, supported by a block 20, fixed to the side 16, the rod passing through orifices in the shanks. Hammer heads 21 are fixed to the free ends of the shanks and are held yieldingly toward the resonant side 12 by springs 22. To the side 17 are similarly hinged a row of hammer shanks 18$^a$, having hammer heads 21$^a$ held yieldingly toward the resonant side 13 by springs 22$^a$. Each hammer head has a dog 23, the dogs on one row of heads projecting toward those of the other row, as shown by Figure 2.

Journaled in bearings 24 on the curb sides 14 and 15 is a shaft 25, extending across the box midway between the resonant walls and between the rows of hammers.

The shaft is provided with toothed hammer-retracting wheels 26, formed to engage the dogs 23 of both rows of hammers. The arrangement is such that when the shaft 25 is rotated, the hammers of both rows are alternately retracted and released by the wheels 26. When the hammers are released, they are caused by the springs to forcibly strike the resonant walls, the hammers of one row striking the wall 12, while those of the other row strike the wall 13. Two volleys of percussive noises are thus simultaneously emitted, the loudness depending to some extent on the force of the springs.

The device preferably includes also two resilient tongues 28 and 28$^a$, fixed to the blocks to which the hammer shanks are hinged, and projecting from said blocks inward, toward the shaft 25, and a toothed actuating wheel 29, fixed to the shaft and located between the free ends of the tongues. The wheel 29 is adapted to simultaneously deflect and release the tongues and thus cause a noise similar to that of a watchman's rattle, and considerably increasing the din.

The shaft 25 may be rotated either by hand, through a crank 30, fixed to the shaft, or by power applied in any suitable way.

Figure 5 shows the device attached to the body 31 of a cart, the shaft 25 being provided with a pulley 32, which is connected by a belt 33, with a pulley 34, fixed to one of the cart wheels.

The curb sides and the blocks 20 constitute supporting means between the resonant walls 12 and 13, supporting the bearings 24 and noise-making elements which include the hammers and the rattle tongues. Said supporting means may be otherwise embodied, if desired.

I claim:

1. A noise-making device comprising a shallow box composed of two parallel resonant walls and a four-sided curb connecting the margins of said walls, two rows of hammers, the hammers of one row being hinged to one side of the curb, and the hammers of the other row to the opposite side, each hammer having a dog, springs yieldingly holding the hammers of one row close to one of the resonant walls, springs yieldingly holding the hammers of the other row close to the opposite resonant wall, and a shaft journaled in bearings in the curb and extending between the rows of hammers, the shaft being provided with toothed hammer-retracting wheels, formed to engage the dogs of both rows of hammers, the arrangement being such that when the shaft is rotated, the hammers of both rows are alternately retracted and released by said wheels and, when released, are caused by the springs to forcibly strike the said resonant walls, the hammers of one row striking one resonant wall, while those of the other row strike the other resonant wall.

2. A noise-making device substantially as specified by claim 1, comprising also resilient tongues fixed to the two curb sides to which the hammers are hinged, and projecting therefrom in opposite directions toward the shaft, and a toothed actuating wheel fixed to the shaft and located between the free ends of said tongues, and adapted to deflect and release the tongues in rapid succession, and thus cause a rattling noise while the hammers are being retracted and released, so that the noises made by the device are due in part to the percussive action of the hammers, and in part, to the retraction and release of the tongues.

In testimony whereof I have affixed my signature.

SALVATORE COLLEDANCHISE.